(12) United States Patent
Lee

(10) Patent No.: US 7,347,061 B2
(45) Date of Patent: Mar. 25, 2008

(54) OIL CHECKING DEVICE FOR COMPRESSOR OF AIR CONDITIONING SYSTEM

(75) Inventor: Deok-Jae Lee, Uijeongbu-si (KR)

(73) Assignee: Metachem Inc., Gyeonggi-do (KR)

( * ) Notice: Subject to any disclaimer, the term of this patent is extended or adjusted under 35 U.S.C. 154(b) by 250 days.

(21) Appl. No.: 10/561,807

(22) PCT Filed: Aug. 13, 2003

(86) PCT No.: PCT/KR03/01635

§ 371 (c)(1),
(2), (4) Date: Dec. 21, 2005

(87) PCT Pub. No.: WO2005/012811

PCT Pub. Date: Feb. 10, 2005

(65) Prior Publication Data

US 2007/0006608 A1    Jan. 11, 2007

(30) Foreign Application Priority Data

Jul. 29, 2003   (KR) .................... 10-2003-0052247

(51) Int. Cl.
 *F25B 43/02*   (2006.01)
(52) U.S. Cl. .......................... 62/468; 62/473
(58) Field of Classification Search .............. 62/84, 62/125, 149, 193, 468, 473, 77, 292; 73/61.41, 73/61.43; 184/103.2
See application file for complete search history.

(56) References Cited

U.S. PATENT DOCUMENTS

| | | | | |
|---|---|---|---|---|
| 3,705,499 A | * | 12/1972 | Mount et al. ............... | 62/84 |
| 4,534,182 A | * | 8/1985 | Toub et al. ................. | 62/193 |
| 4,625,523 A | * | 12/1986 | Toub et al. ................. | 62/193 |
| 4,698,983 A | * | 10/1987 | Hechavarria .............. | 62/292 |
| 4,866,994 A | * | 9/1989 | Baker ..................... | 73/863.12 |
| 4,982,576 A | * | 1/1991 | Proctor et al. ............ | 62/292 |
| 5,086,630 A | * | 2/1992 | Van Steenburgh, Jr. ..... | 62/475 |
| 5,133,880 A | * | 7/1992 | Lundquist et al. ........ | 210/774 |
| 5,401,149 A | * | 3/1995 | Tsuru et al. ............. | 418/178 |

(Continued)

FOREIGN PATENT DOCUMENTS

JP        02-154959        6/1990

(Continued)

*Primary Examiner*—Mohammad M. Ali
(74) *Attorney, Agent, or Firm*—Birch, Stewart, Kolasch & Birch, LLP

(57) ABSTRACT

An oil checking device for compressor of air conditioning system includes an oil container connected to an high-pressure part of the air conditioning system to receive refrigerant and oil from the high-pressure part, the oil container being formed of a transparent material so that a user can observe the oil mixed with the refrigerant, a valve member for selectively opening a gas line and a liquid line respectively connected to upper-inner and lower-inner portions of the oil container to exhaust refrigerant gas and compressor oil from the oil container to a low-pressure part of the air conditioning system, a ball floater disposed in the oil container, and an oil amount/state display part formed on the oil container, the oil amount/state display part having a reference oil level that can be compared with the compressor oil level and a reference color that can be compared with a color of the compressor oil.

6 Claims, 4 Drawing Sheets

U.S. PATENT DOCUMENTS 5,678,657 A * 10/1997 Lee .......................... 184/6.16
5,884,494 A * 3/1999 Okoren et al. ................ 62/126
6,776,029 B2 * 8/2004 Hotta et al. ................ 73/61.41

FOREIGN PATENT DOCUMENTS

| | | |
|---|---|---|
| JP | 2001-324247 | 11/2001 |
| JP | 2002-156274 | 5/2002 |
| JP | 2003-21611 A * | 1/2003 |
| JP | 2003-065640 | 3/2003 |

\* cited by examiner

OIL CHECKING DEVICE FOR COMPRESSOR OF AIR CONDITIONING SYSTEM

BACKGROUND OF THE INVENTION

1. Field of the Invention

The present invention relates to an oil checking device for compressor of air conditioning system, and more particularly, to an oil checking device that can check an amount of compressor oil used for an air conditioning system, thereby letting a user determine whether it is time to change the compressor oil.

2. Description of the Related Art

Generally, a compressor for an air conditioning system compresses refrigerant to convert the same from a high temperature gas state into a high temperature liquid state and circulates the same in the air conditioning system. At this point, the refrigerant circulates in a state where it is mixed with compressor oil.

The compressor oil should be maintained in a proper amount and a clean state to smoothly operate a refrigerant compression part of the compressor, while preventing the refrigerant compression part from being worn.

Korean Utility Model No. 20-207832 discloses an oil-checking device for a compressor of a vehicle's air conditioning system, which lets a user identify the amount and change time of compressor oil.

The oil-checking device is designed such that the user determines an amount and changing time of the compressor oil by extracting refrigerant gas of the air conditioning system through an oil filter and identifying an amount and color of oil remaining in the oil filter.

Accordingly, such an oil-checking device has a problem in that it cannot provide accuracy in determining the amount and changing time of the compressor oil.

Furthermore, since the oil-checking device is designed to exhaust the refrigerant gas into the air, it causes air pollution and a waste of the refrigerant.

SUMMARY OF THE INVENTION

Accordingly, the present invention is directed to an oil checking device for compressor of air conditioning system that substantially obviates one or more problems due to limitations and disadvantages of the related art.

An objective of the present invention is to provide an oil checking device for compressor of air conditioning system that can prolong the life of the air compressor and improve the performance of the air conditioning system, by allowing a user to appropriately manage compressor oil in advance by determining a proper amount and changing time of the compressor oil used in the air conditioning system.

Another objective of the present invention is to provide an oil checking device for compressor of air conditioning system that can prolong the life of the air compressor and improve the performance of the air conditioning system by removing moisture and impurities contained in the compressor oil. To achieve the above objectives, the present invention provides an oil checking device for compressor of air conditioning system, comprising: an oil container connected to an high-pressure part of the air conditioning system to receive refrigerant and oil from the high-pressure part, the oil container being formed of a transparent material so that a user can observe the oil mixed with the refrigerant; valve means for selectively opening a gas line and a liquid line respectively connected to upper-inner and lower-inner portions of the oil container to exhaust refrigerant gas and compressor oil from the oil container to a low-pressure part of the air conditioning system; a ball floater disposed in the oil container, the ball floater being designed to rise on a compressor oil surface when a buoyancy reaches a predetermined level as a density of the compressor oil is increased according to the operation of the valve means; and an oil amount/state display part formed on the oil container, the oil amount/state display part having a reference oil level that can be compared with the compressor oil level and a reference color that can be compared with a color of the compressor oil.

Preferably, the oil container comprises a heat exchanger for providing a thermal balance between the compressor oil that is decreased in a temperature by vaporization latent heat of the refrigerant and an outer air.

Preferably, the valve means comprises a three-way valve for selectively connecting the gas and liquid lines to the low-pressure part.

Preferably, a drier may be disposed on the gas line and a strainer may be installed to the low-pressure part.

Alternatively, the valve means may comprises a gas control valve installed on the gas line and a three-way valve disposed between the liquid line and the low-pressure part, the valve means being integrally formed on the oil container.

Preferably, the oil container further comprises a separating plate installed on a high-pressure connecting side.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
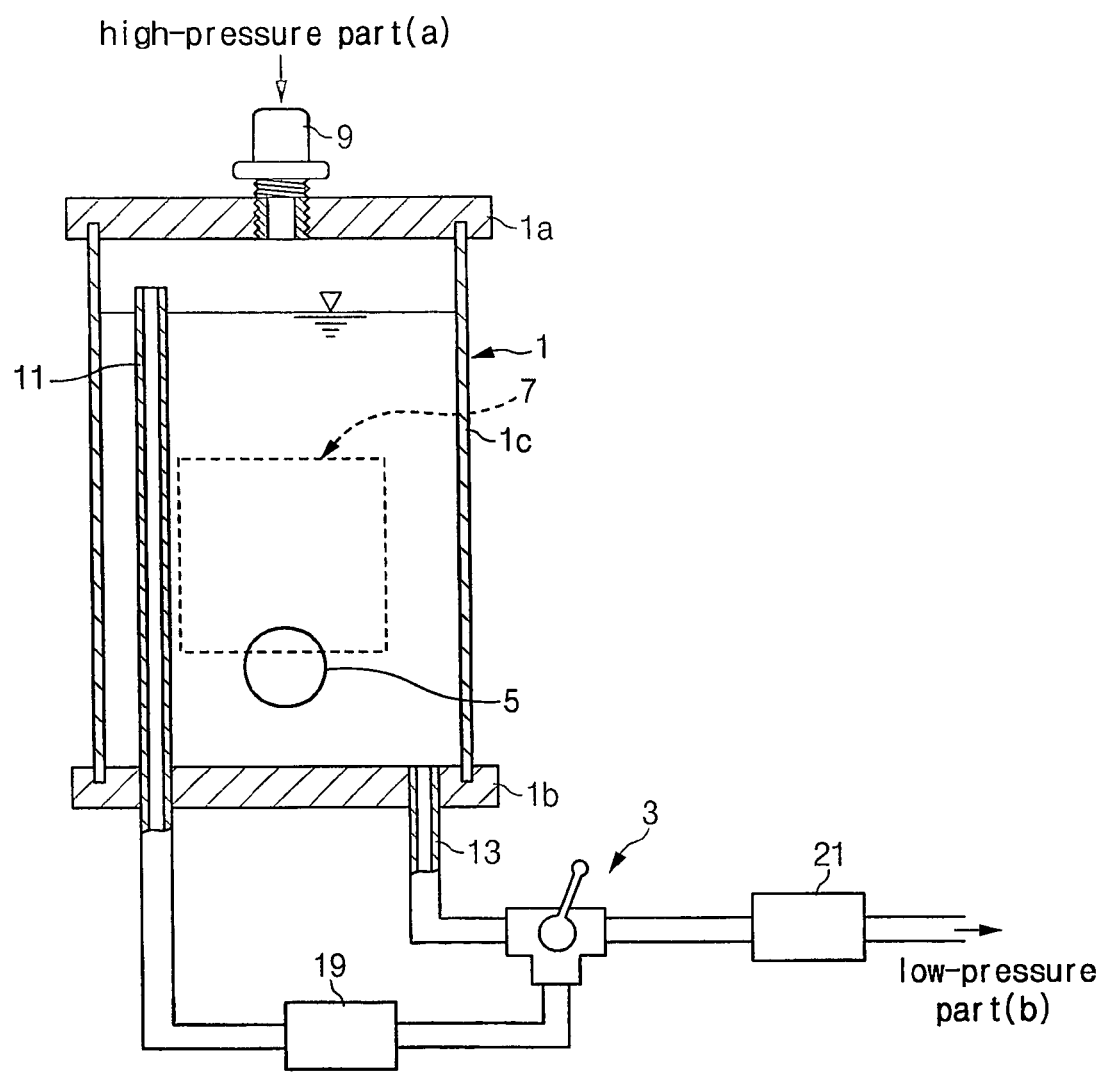
FIG. 1 is a sectional view of an oil checking device for compressor of air conditioning system according to a first embodiment of the present invention.

FIG. 1 shows a sectional view of an oil checking device for compressor of air conditioning system according to a first embodiment of the present invention.

As shown in the drawing, the inventive oil checking device comprises an oil container 1, a three-way valve 3, a ball floater 5, and an oil amount/state display part 7.

The oil container 1 is designed to be installed on a refrigerant line of the air conditioning system.

The oil container 1 is designed to receive the refrigerant/oil mixture from a high-pressure part "a" of the air conditioning system, and it is designed such that a user can observe the refrigerant/oil mixture. In this embodiment, although the oil container 1 is comprised of upper and lower plates 1a and 1b and a cylinder 1c, the present invention is not limited to this. In addition, the coupling structure of the upper and lower plates 1a and 1b and the cylinder 1c can be realized in a variety of designs. Therefore, the detailed structure of the oil container will be omitted herein.

The oil container 1 is provided at a side with a connecting member 9 connected to the high-pressure part "a" of the air conditioning system, and at another side with the three-way valve 3 connected to a low-pressure part "b." When a manifold gage is used, it is preferable that the connecting member 9 of the oil container 1 is connected to a low-pressure part of the manifold gage and the three-way gage 3 is connected to an oil separator.

The oil container 1 is made of a transparent material such that the user can observe the inside thereof, and is sealed against the high-pressure of the refrigerant/oil mixture.

The oil container 1 is formed of a variety of materials such as a reinforced glass, polycarbonate, or polyethylene synthetic material. Furthermore, it is preferable that the oil container 1 is designed having a design pressure of above 14 kg/cm2 and a breaking stress of above 45 kg/cm2 considering a working pressure of the compressor.

A gas line 11 is connected to an upper-inner portion of the oil container 1, and a liquid line 13 is connected to a lower-inner portion of the oil container 1. That is, the gas line 11 is designed having an inlet located on the upper-inner portion of the oil container 1 such that it can exhaust only the refrigerant/oil mixture gas. The liquid line 13 is designed having an inlet located on the lower-inner portion of the oil container 1 such that it can exhaust refrigerant/oil mixture liquid.

To accurately check the compressor oil, it is preferable that the gas in the oil container 1 is extracted through the connecting member 9 after the compressor oil is filled up to the inlet of the gas line 11 and the oil container 1 is separated from the high-pressure part "b" of the air conditioning system.

The three-way valve 3 is designed to selectively connect or disconnect the gas and liquid lines 11 and 13 to or from the low-pressure part "b." The three-way valve 3 is a device for opening/closing the gas and liquid lines 13, a structure of which is not limited to this but can be varied in a variety of designs.

That is, in accordance with the selective operation of the three-way valve 3, the refrigerant in the oil container 1 is supplied in a gas state to the low-pressure part "b" through the gas line 11 or in a liquid state to the low-pressure part "b" through the liquid line 13.

When the three-way valve 3 connects the gas line 11 to the low-pressure part "b," since a solvent in the oil container 1 is vaporized and supplied to the low-pressure part "b" through the gas line 11, the density of the compressor oil is gradually increased. With the density of the compressor oil increased, the buoyancy of the compressor oil is also increased.

The ball floater 5 is installed in the oil container 1 so that the user can determine the amount of compressor oil in the air conditioning system by using the buoyancy of the compressor oil varied as in the above. The ball floater 5 is designed to rise to a compressor oil surface when the density of the compressor oil is increased to a predetermined level, which increases the buoyancy of the ball floater 5.

The compressor oil and the refrigerant are mixed in a ratio of 2:8 and filled in the air conditioning system. Preferably, the ball floater 5 is designed such that it can rise on the compressor oil surface when the density of the compressor oil becomes 70-80%. The density range of the compressor oil can be enlarged to 10-90%. However, when the ball floater is designed to rise at less than 70%, the determination of the amount of oil can be quickly realized, but the error is increased. When the ball floater 5 is designed to rise at above 80%, the accuracy is improved but the time is prolonged.

The rising time of the floater 5 is further related to a diameter of the oil container 1. When the diameter of the oil container 1 is large, since the vaporization time of the refrigerant gas is increased, the rising time of the ball floater is increased. Accordingly, the accuracy of the oil amount determination can be improved. However, when the diameter of the oil container 1 is small, since the vaporization time of the refrigerant gas is reduced, the rising time of the ball floater 5 is increased. Accordingly, although the oil amount determination is possible in a short time, the accuracy of the oil amount determination is deteriorated.

Since the oil amount/state display part 7 is formed on the oil container 1, when the floater 5 rises, the actual oil level remaining in the oil container 1 can be directly compared with a reference oil level 15, and the color of the actual oil in the container 1 can also be directly compared with a reference color 17.

Figure 2:
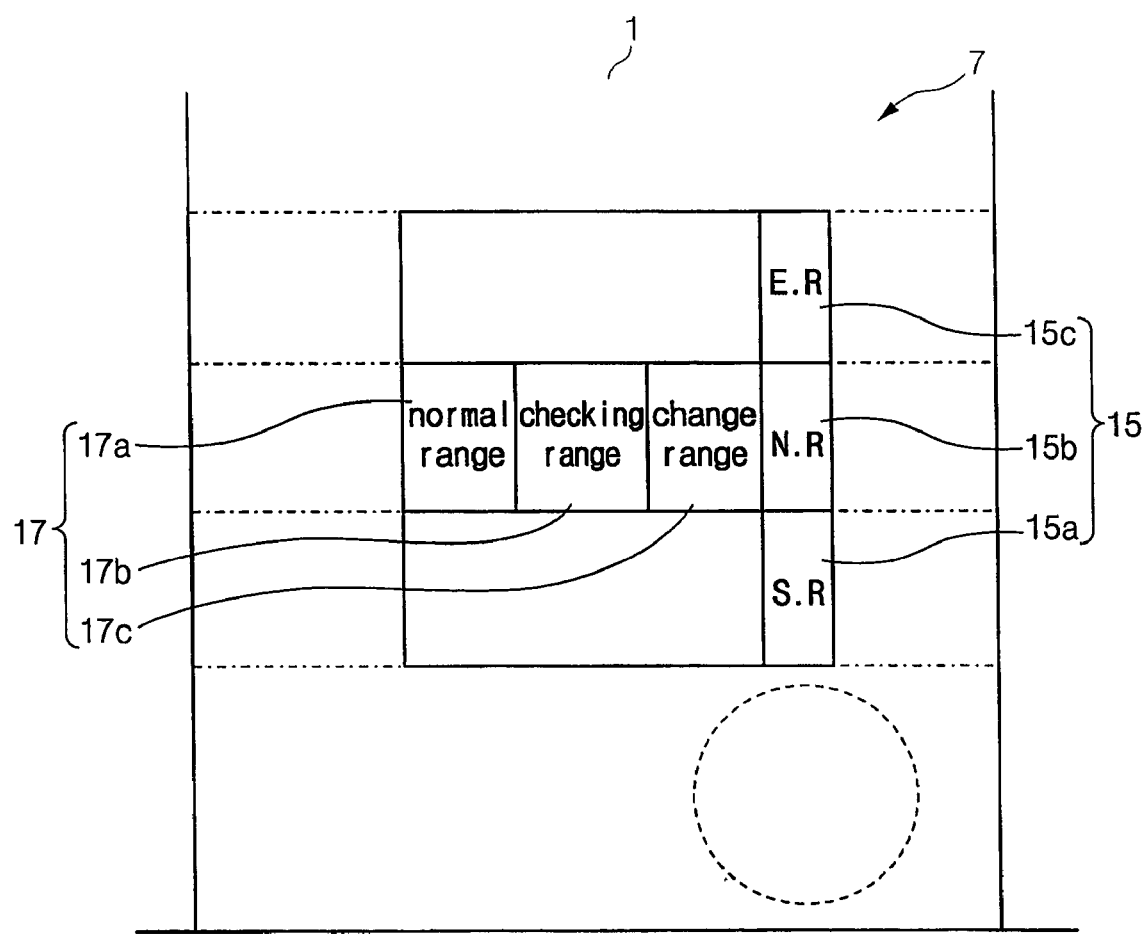
FIG. 2 is a schematic view illustrating an oil amount/state display part of an oil checking device for compressor of air conditioning system according to the present invention.

That is, as shown in FIG. 2, the oil amount/state display part 7 displays the reference oil level 15 in a longitudinal direction, and the reference color in a lateral direction, within a normal range of the reference color 17.

The reference oil level 15 includes a shortage range 15a, a normal range 15b above the shortage range 15a, and an excessive range 15c above the normal range 15b to illustrate the shortage, normal and excessive states of the compressor oil amount in the air conditioning system.

That is, the user can easily determine if the amount of oil is short or excessive by identifying where the actual oil level of the compressor oil remaining in the oil container 1 among the shortage, normal, and excessive ranges 15a, 15b, and 15c. The user adds or exhausts oil to or from the oil container 1 in accordance with the range where the actual oil level is located.

In addition, the reference color 17 includes a normal range 17a, a checking range 17b, and a change range 17c to illustrate the oil state in the air conditioning system.

The ranges 17a, 17b, and 17c of the reference color 17 are formed of consecutive colors from a white color to a dark red color. That is, the compressor oil changes from the white color to the dark red color by oxidation, carbonization, and pollution. The ranges 17a, 17b, and 17c are identical to the changed color ranges of the compressor oil.

Accordingly, the user can easily determine the compressor oil change time by identifying the range to which the color of the compressor oil remaining in the oil container 1 corresponds. That is, the user can determine the oil state by comparing the normal, checking, and change ranges to the color of the compressor oil.

After checking the compressor oil state, the gas line 11 is closed by controlling the three-way valve 3 to recover the compressor oil in the oil container 1 to the low-pressure part "b" through the liquid line 13.

Meanwhile, it is preferable that a drier 19 is provided on the gas line 11. The drier 19 is designed to absorb moisture contained in the refrigerant gas exhausted through the gas line 11 and is periodically replaced. The drier 19 is preferably a molecular sieve type.

It is further preferable that a strainer 21 is installed on the low-pressure part "b." The strainer 21 is designed to filter out impurities contained in the compressor oil/refrigerant mixture fed from the oil container 1 to the low-pressure part "b." and is also periodically replaced. The strainer 21 is preferably formed of a wire netting having more than 100-mesh.

Figure 3:
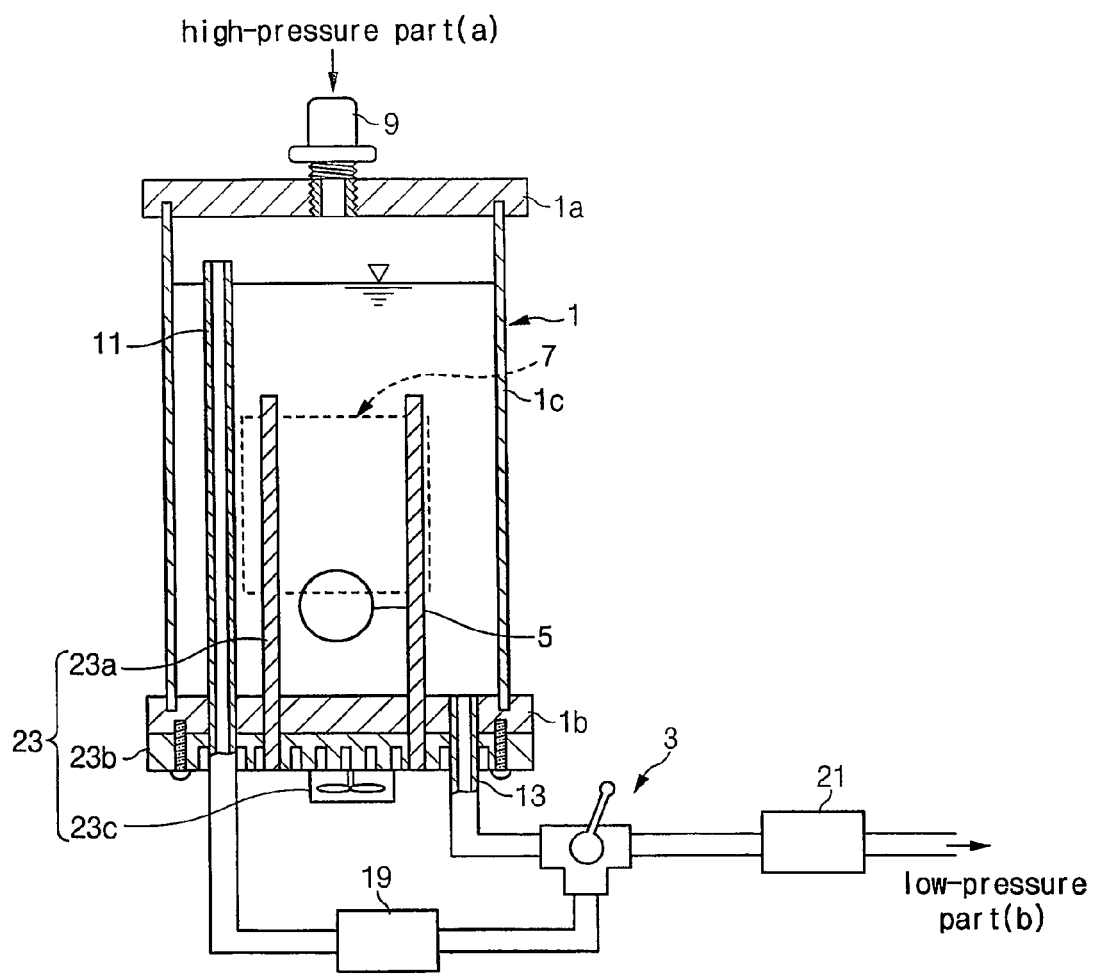
FIG. 3 is a sectional view of an oil checking device for compressor of air conditioning system according to a second embodiment of the present invention.

FIG. 3 shows a sectional view of an oil checking device for compressor of air conditioning system according to a second embodiment of the present invention. A general structure and operational effect of the oil checking device of this embodiment is identical to that of the first embodiment.

Accordingly, the parts identical to those of the first embodiment will be omitted herein, and only different parts will be described hereinafter.

The oil container 1 of this embodiment is further provided with a heat exchanger 23 that is designed to provide a thermal balance between the compressor oil that is reduced in temperature by vaporization of the refrigerant, and the outer air.

The heat exchanger 23 comprises a heat transmission rod 23a installed in the oil container 1, a cooling fin 23b connected to the heat transmission rod 23a and disposed outside the oil container 1, and a cooling fan 23c formed on the cooling fin 23b.

Figure 4:
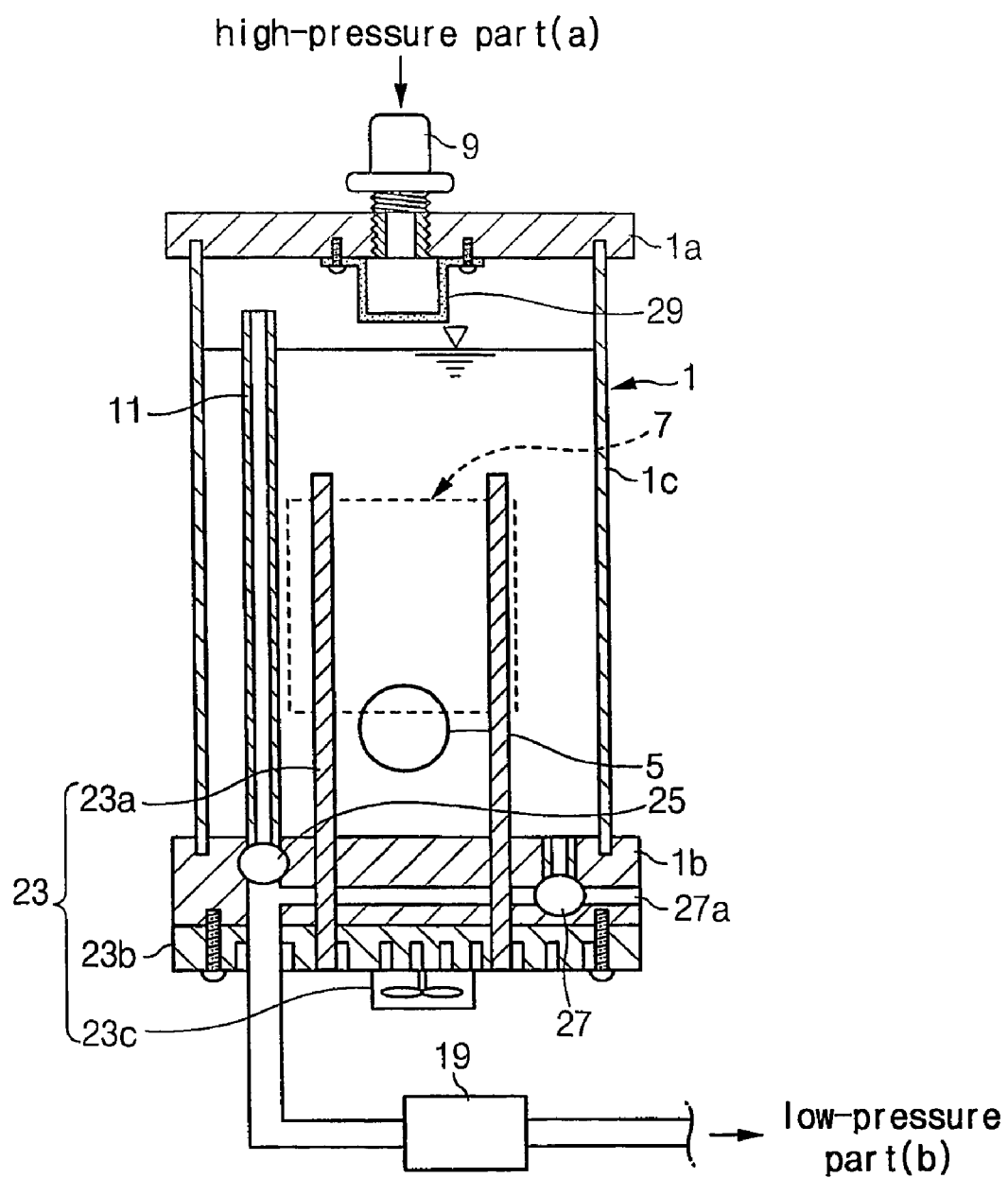
FIG. 4 is a sectional view of an oil checking device for compressor of air conditioning system according to a third embodiment of the present invention.

When the temperature of the compressor oil is reduced by the vaporization latent heat, the cooling fan 23c is driven to supply the outer air having a relatively high temperature to the cooling fin 23b. The cooling fin 26b transmits the heat to the compressor oil through the heat transmission rod 23a to accelerate the vaporization of the refrigerant mixed with the compressor oil. The acceleration of the vaporization reduces the time for rise of the ball floater 5, thereby reducing the checking time of the compressor oil. FIG. 4 shows a sectional view of an oil checking device for compressor of air conditioning system according to a third embodiment of the present invention. A general structure and operational effect of the oil checking device of this embodiment is identical to that of the first and second embodiments.

Accordingly, the parts identical to those of the first and second embodiments will be omitted herein, and only different parts will be described hereinafter.

In this embodiment, valve means comprised of a gas control valve 25 and a three-way valve 27 is integrated with the oil container 1.

The gas control valve 25 is provided on the gas line 11 to adjust the exhaust of the refrigerant gas.

The three-way valve 27 is provided on the liquid line 13 to adjust the exhaust of the compressor oil mixed with the refrigerant. That is, three-way valve 27 is disposed between the gas line 11 and the liquid line 13 to control the interconnection of the liquid line 13 and the gas line 11 upstream of the gas control valve 25. The three-way valve 27 is provided with an exhaust member 27a for exhausting inferior compressor oil.

In addition, the oil container 1 is further provided with a separation plate 29 at a connection part to the high-pressure part "a." The separation plate 29 generates foam to expedite the vaporization of the refrigerant when the refrigerant/oil mixture flow into the oil container 1.

The separation plate 29 and the heat exchanger 23 can be independently applied to the oil container 1, but when they are applied together, the vaporization of the refrigerant can be further expedited.

As described above, the oil checking device for compressor of air conditioning system according to the present invention has the ball floater received in the transparent oil container, which rises when the density of the compressor oil reaches a predetermined level. In addition, the oil amount/state display part displaying the reference colors is formed on the oil container.

Therefore, the actual oil level remaining in the oil container can be directly compared with the reference oil level, thereby making it possible to determine the amount of the compressor oil. Furthermore, the color of the actual oil in the container can be directly compared with a reference color when the ball floater rises, thereby making it possible to let the user to determine the oil change time.

As a result, it is possible to check the oil state in advance, thereby prolonging the life of the compressor and improving the performance of the air conditioning system.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An oil checking device for compressor of air conditioning system, comprising:
    an oil container connected to an high-pressure part of the air conditioning system to receive refrigerant and oil from the high-pressure part, the oil container being formed of a transparent material so that a user can observe the oil mixed with the refrigerant;
    valve means for selectively opening a gas line and a liquid line respectively connected to upper-inner and lower-inner portions of the oil container to exhaust refrigerant gas and compressor oil from the oil container to a low-pressure part of the air conditioning system;
    a ball floater disposed in the oil container, the ball floater being designed to rise on a compressor oil surface when a buoyancy reaches a predetermined level as a density of the compressor oil is increased according to the operation of the valve means; and
    an oil amount/state display part formed on the oil container, the oil amount/state display part having a reference oil level that can be compared with the compressor oil level and a reference color that can be compared with a color of the compressor oil.

2. The oil checking device of claim 1 wherein the oil container comprises a heat exchanger for providing a thermal balance between the compressor oil that is decreased in, a temperature by vaporization of the refrigerant and an outer air.

3. The oil checking device of one of claims 1 and 2 wherein the valve means comprises a three-way valve for selectively connecting the gas and liquid lines to the low-pressure part.

4. The oil checking device of claim 3 wherein a drier is disposed on the gas line and a strainer is installed to the low-pressure part.

5. The oil checking device of one of claims 1 and 2 wherein the valve means comprises a gas control valve installed on the gas line and a three-way valve disposed between the liquid line and the low-pressure part, the valve means being integrally formed on the oil container.

6. The oil checking device of one of claims 1 and 2 wherein the oil container further comprises a separating plate installed on a high-pressure connecting side.

* * * * *